United States Patent  (10) Patent No.: US 7,251,721 B1
Nguyen et al.  (45) Date of Patent: Jul. 31, 2007

(54) CONDITIONAL LINK POINTER REGISTER SETS MARKING THE BEGINNING AND END OF A CONDITIONAL INSTRUCTION BLOCK WHERE EACH SET CORRESPONDS TO A SINGLE STAGE OF A PIPELINE THAT MOVES LINK POINTERS THROUGH EACH CORRESPONDING REGISTER OF SAID REGISTER SETS AS INSTRUCTIONS MOVE THROUGH THE PIPELINE

(75) Inventors: Hung T. Nguyen, Plano, TX (US); Shannon A. Wichman, McKinney, TX (US)

(73) Assignee: VeriSilicon Holdings (Cayman Islands) Co. Ltd., Santa Clara, CA (US)

( * ) Notice: Subject to any disclaimer, the term of this patent is extended or adjusted under 35 U.S.C. 154(b) by 571 days.

(21) Appl. No.: 09/993,114

(22) Filed: Nov. 5, 2001

(51) Int. Cl.
   *G06F 15/00* (2006.01)
(52) U.S. Cl. ............... 712/234; 712/226; 712/201; 712/27

(58) Field of Classification Search .............. 712/234, 712/226, 224, 235–238, 216, 218, 201, 25, 712/26, 27, 239–244, 205, 208, 211
See application file for complete search history.

(56) References Cited

U.S. PATENT DOCUMENTS

| 6,115,808 A * | 9/2000 | Arora ......................... 712/219 |
| 6,421,774 B1 * | 7/2002 | Henry et al. ................ 712/239 |
| 6,988,190 B1 * | 1/2006 | Park ........................... 712/241 |

* cited by examiner

*Primary Examiner*—Donald Sparks
*Assistant Examiner*—Tonia L. Meonske

(57) ABSTRACT

For use in a wide-issue processor, a mechanism for, and method of, conditionally executing instructions and a digital signal processor (DSP) incorporating the mechanism or the method. In one embodiment, the mechanism includes: (1) a conditional execution block state machine that tags and generates link pointers for instructions located in a conditional execution block and (2) conditional link pointer registers, associated with stages in a pipeline of the processor, that contain and cause the link pointers to move therethrough as the instructions located in the conditional execution block move through the stages.

14 Claims, 5 Drawing Sheets

CONDITIONAL LINK POINTER REGISTER SETS MARKING THE BEGINNING AND END OF A CONDITIONAL INSTRUCTION BLOCK WHERE EACH SET CORRESPONDS TO A SINGLE STAGE OF A PIPELINE THAT MOVES LINK POINTERS THROUGH EACH CORRESPONDING REGISTER OF SAID REGISTER SETS AS INSTRUCTIONS MOVE THROUGH THE PIPELINE

TECHNICAL FIELD OF THE INVENTION

The present invention is directed, in general, to digital signal processors (DSPs) and, more specifically, to a mechanism and method for conditionally executing instructions and a DSP incorporating the mechanism or the method.

BACKGROUND OF THE INVENTION

Over the last several years, DSPs have become an important tool, particularly in the real-time modification of signal streams. They have found use in all manner of electronic devices and will continue to grow in power and popularity.

As time has passed, greater performance has been demanded of DSPs. In most cases, performance increases are realized by increases in speed. One approach to improve DSP performance is to increase the rate of the clock that drives the DSP. As the clock rate increases, however, the DSP's power consumption and temperature also increase. Increased power consumption is expensive, and intolerable in battery-powered applications. Further, high circuit temperatures may damage the DSP. The DSP clock rate may not increase beyond a threshold physical speed at which signals may traverse the DSP. Simply stated, there is a practical maximum to the clock rate that is acceptable to conventional DSPs.

An alternate approach to improve DSP performance is to increase the number of instructions executed per clock cycle by the DSP ("DSP throughput"). One technique for increasing DSP throughput is pipelining, which calls for the DSP to be divided into separate processing stages (collectively termed a "pipeline"). Instructions are processed in an "assembly line" fashion in the processing stages. Each processing stage is optimized to perform a particular processing function, thereby causing the DSP as a whole to become faster.

"Superpipelining" extends the pipelining concept further by allowing the simultaneous processing of multiple instructions in the pipeline. Consider, as an example, a DSP in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall DSP speed is "superscalar" processing. Superscalar processing calls for multiple instructions to be processed per clock cycle. Assuming that instructions are independent of one another (the execution of each instruction does not depend upon the execution of any other instruction), DSP throughput is increased in proportion to the number of instructions processed per clock cycle ("degree of scalability"). If, for example, a particular DSP architecture is superscalar to degree three (i.e., three instructions are processed during each clock cycle), the instruction throughput of the DSP is theoretically tripled.

These techniques are not mutually exclusive; DSPs may be both superpipelined and superscalar. However, operation of such DSPs in practice is often far from ideal, as instructions tend to depend upon one another and are also often not executed efficiently within the pipeline stages. In actual operation, instructions often require varying amounts of DSP resources, creating interruptions ("bubbles" or "stalls") in the flow of instructions through the pipeline. Consequently, while superpipelining and superscalar techniques do increase throughput, the actual throughput of the DSP ultimately depends upon the particular instructions processed during a given period of time and the particular implementation of the DSP's architecture.

The speed at which a DSP can perform a desired task is also a function of the number of instructions required to code the task. A DSP may require one or many clock cycles to execute a particular instruction. Thus, in order to enhance the speed at which a DSP can perform a desired task, both the number of instructions used to code the task as well as the number of clock cycles required to execute each instruction should be minimized.

Fetching instructions from memory takes time and can therefore inhibit DSP performance. If, on the other hand, the DSP can be engaged in the execution of some instructions while other instructions are being fetched, DSP performance can remain high. Fetching instructions before they are actually needed for issuance into a pipeline is called "prefetching."

One conventional programming technique is called "conditional execution." Instructions in what is called a "conditional execution block," or "CE block," are only validly executed upon the occurrence of a condition established in a conditional branch instruction. If the condition does not occur, the instructions in the CE block are ignored.

As with all other instructions, prefetching of instructions in a CE block is advantageous. It is also advantageous to issue those instructions into the pipeline, even though the condition that determines whether they should be validly executed remains unresolved. Of course, if the condition is resolved in the affirmative ("true"), execution of the instructions in the CE block is already underway, and DSP performance remains intact. Unfortunately, if the condition is resolved in the negative ("false"), the instructions in the CE block must be flushed from the pipeline so that they do not corrupt valid data or further consume the DSP's processing resources.

To allow the flushing and restoration to take place, instructions that are in the CE block should be identified and tracked as they traverse the DSP's pipeline. Unfortunately, conventional mechanisms for identifying and tracking CE blocks involved many registers and much moving around of instructions and associated tags. All of this consumed time and electric power. In the case of battery-powered DSPs, this power dissipation proves disadvantageous.

What is needed in the art is a more efficient way to identify and track CE instructions as they traverse a processor pipeline.

SUMMARY OF THE INVENTION

To address the above-discussed deficiencies of the prior art, the present invention provides, for use in a wide-issue processor, a mechanism for, and method of, conditionally executing instructions and a DSP incorporating the mechanism or the method. In one embodiment, the mechanism includes: (1) a CE block state machine that tags and generates link pointers for instructions located in a CE block and (2) conditional link pointer registers, associated with stages in a pipeline of the processor, that contain and cause the link pointers to move therethrough as the instructions located in the CE block move through the stages.

The present invention therefore introduces a hardware-based mechanism for identifying the instructions that fall within a CE block and tracking those instructions by way of link pointers as they traverse the pipeline of a wide-issue processor. The mechanism saves power that would otherwise be required to shift the instructions themselves during their execution in the pipeline. Throughout this application, "conditional execution," "CE," and "cexe" are synonymous, though one skilled in the art should understand that "cexe" is an opcode in an instruction set particular to the DSP of the illustrated embodiment.

In one embodiment of the present invention, the mechanism further includes a CE marking queue, associated with the CE block state machine, that contains ones of the link pointers prior to storage in the conditional link pointer registers. In a more specific embodiment, the CE marking queue is a five-bit, six-entry queue and comprises a reordering multiplexer.

In one embodiment of the present invention, the mechanism further includes a CE attribute register, associated with a group stage of the pipeline, that contains an attribute associated with one of the conditional instructions. In a more specific embodiment, the CE attribute register is a seven-bit register.

In one embodiment of the present invention, the mechanism further includes a CE attribute queue that contains attributes read from the CE attribute register. In a more specific embodiment, the CE attribute queue is of variable depth and comprises a selecting multiplexer.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
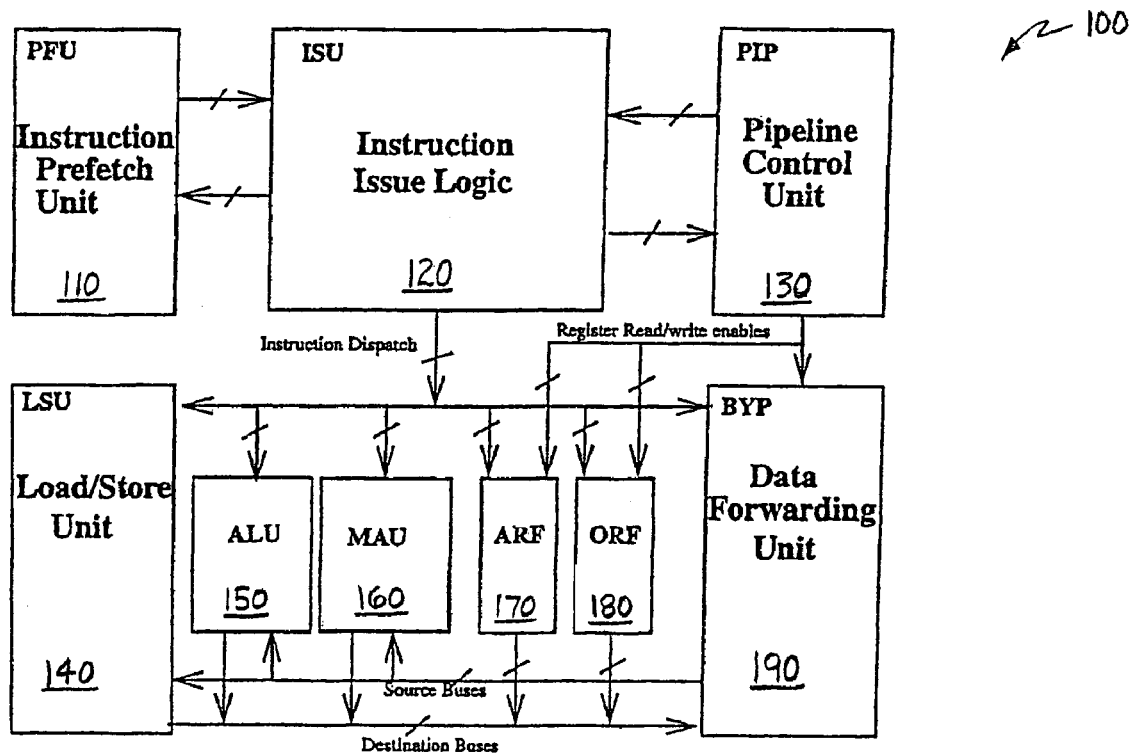
FIG. 1 illustrates an exemplary DSP which may form an environment within which a mechanism for conditionally executing instructions constructed according to the principles of the present invention can operate.

Referring initially to FIG. 1, illustrated is an exemplary DSP, generally designated 100, which may form an environment within which a mechanism for conditionally executing instructions constructed according to the principles of the present invention can operate. Those skilled in the pertinent art should understand that the mechanism of the present invention may be applied to advantage in other conventional or later-discovered DSP or general-purpose, non-DSP, processor architectures.

The DSP 100 contains an instruction prefetch unit (PFU) 110. The PFU 110 is responsible for anticipating (sometimes guessing) and prefetching from memory the instructions that the DSP 100 will need to execute in the future. The PFU 110 allows the DSP 100 to operate faster, because fetching instructions from memory involves some delay. If the fetching can be done ahead of time and while the DSP 100 is executing other instructions, that delay does not prejudice the speed of the DSP 100.

The DSP 100 further contains instruction issue logic (ISU) 120. The ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., arithmetic logic unit, multiply-accumulate unit and address and operand register files) and retiring instructions after they have been executed or are otherwise no longer of use. Accordingly, the ISU 120 cooperates with the PFU 110 to receive prefetched instructions for issuance.

In a normal operating environment, the DSP 100 processes a stream of data (such as voice, audio or video), often in real-time. The DSP 100 is adapted to receive the data stream into a pipeline (detailed in Table 1 below and comprising eight stages). The pipeline is under control of a pipeline control unit (PIP) 130. The PIP 130 is responsible for moving the data stream through the pipeline and for ensuring that the data stream is operated on properly. Accordingly, the PIP 130 coordinates with the ISU 120 to ensure that the issuance of instructions is synchronized with the operation of the pipeline, that data serving as operands for the instructions are loaded and stored in proper place and that the necessary processing resources are available when required.

TABLE 1

Pipeline Stages

| Stage | Employed to |
| --- | --- |
| Fetch/Decode (F/D) | fetch and decode instructions |
| | identify CE instructions and generate CE link pointers |
| Group (GR) | check grouping and dependency rules |
| | group valid instructions |
| | execute return instructions |
| | group CE instructions and blocks |
| Read (RD) | read operands for address generation and control |

TABLE 1-continued

Pipeline Stages

| Stage | Employed to |
| --- | --- |
| | register update |
| | dispatch valid instructions to all functional units |
| | execute move immediate to control register instructions |
| Address Generation (AG) | calculate addresses for all loads and stores |
| | execute bit operations on control registers |
| Memory Read 0 (M0) | send registered address and request to the memory subsystem. |
| Memory Read 1 (M1) | load data from the memory subsystem |
| | register return data in the ORF (term defined below) |
| | read operands for execution from the ORF. |
| Execute (EX) | execute remaining instructions |
| | write results to the ORF or ARF and send results to BYP (terms defined below) |
| Writeback (WB) | register results in the ORF or the ARF (term defined below) |

A load/store unit (LSU) 140 is coupled to, and under the control of, the PIP 130. The LSU 140 is responsible for retrieving the data that serves as operands for the instructions from memory (a process called "loading") and saving that data back to the memory as appropriate (a process called "storing"). Accordingly, though FIG. 1 does not show such, the LSU 140 is coupled to a data memory unit, which manages data memory to load and store data as directed by the LSU 140. The DSP 100 may be capable of supporting self-modifying code (code that changes during its own execution). If so, the LSU 140 is also responsible for loading and storing instructions making up that code as though the instructions were data.

As mentioned above, the DSP 100 contains various processing resources that can be brought to bear in the execution of instructions and the modification of the data in the data stream. An arithmetic logic unit (ALU) 150 performs general mathematical and logical operations (such as addition, subtraction, shifting, rotating and Boolean operations) and is coupled to, and under control of, both the ISU 120 and the PIP 130. A multiply-accumulate unit (MAC) and another ALU are provided in a MAC/accumulate unit (MAU) 160 to perform multiplication and division calculations and calculations that are substantially based on multiplication or division and, as the ALU 150, is coupled to, and under control of, both the ISU 120 and the PIP 130.

The DSP 100 contains very fast, but small, memory units used to hold information needed by instructions executing in the various stages of the pipeline. That memory is divided into individually designated locations called "registers." Because the various stages of the pipeline employ the registers in their instruction-processing, the registers are directly accessible by the stages. The DSP 100 specifically contains an address register file (ARF) 170 and an operand register file (ORF) 180. As the names imply, the ARF 170 holds addresses (typically corresponding to memory locations containing data used by the stages) and the ORF 180 holds operands (data that can be directly used without having to retrieve it from further memory locations).

Certain data may be required for more than one instruction. For example, the results of one calculation may be critical to a later calculation. Accordingly, a data forwarding unit (BYP) 190 ensures that results of earlier data processing in the pipeline are available for subsequent processing without unnecessary delay.

Though not illustrated in FIG. 1, the DSP 100 has an overall memory architecture that 100 is typical of conventional DSPs and microprocessors. That is, its registers are fast but small; its instruction and date caches (contained respectively in the PFU 110 and the LSU 140) are larger, but still inadequate to hold more than a handful of instructions or data; its local instruction memory and data memory 122 are larger still, but may be inadequate to hold an entire program or all of its data. An external memory (not located within the DSP 100 itself) is employed to hold any excess instructions or data.

It should be noted in this context that the illustrated DSP 100 is of a Harvard architecture. Its instruction and data memories are separate, controlled by separate controllers and separately addressed by the PFU 110 and the LSU 140, respectively. Those skilled in the pertinent art should understand, however, that the principles of the present invention are as easily applied to a von Neumann architecture (one in which instruction and data memories are merged into a single logical entity).

Figure 2:
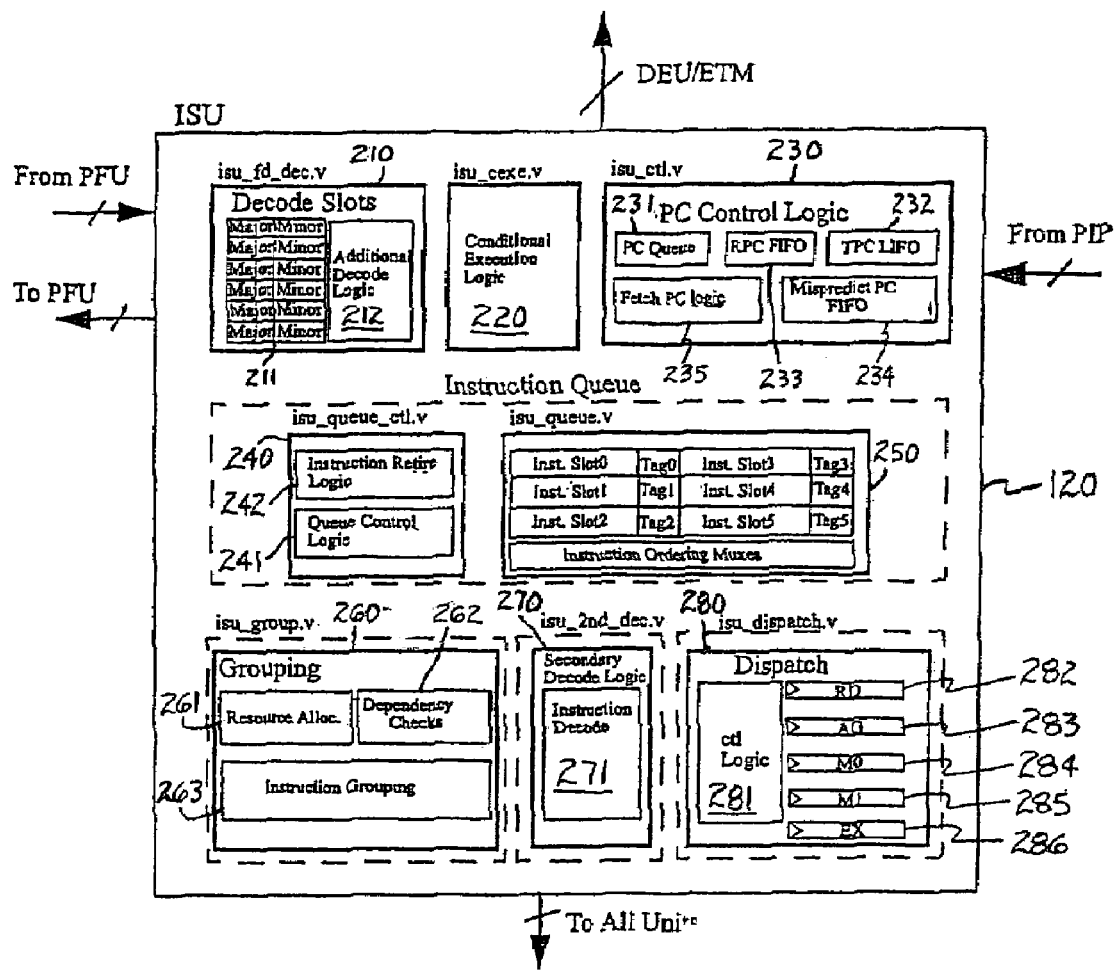
FIG. 2 illustrates in greater detail an instruction issue unit of the DSP of FIG. 1.

Turning now to FIG. 2, illustrated in greater detail is the ISU 120 of FIG. 1. Recall that the ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., the ALU 150, the MAU 160, the ARF 170 and the ORF 180) and retiring instructions after they have been executed, invalidated or are otherwise no longer of use.

The illustrated ISU 120 is capable of decoding and issuing up to six instructions in order. To perform this function, the ISU 120 receives partially decoded instructions from an instruction queue within the PFU 110 of FIG. 1 and communicates with the F/D, GR, RD, AG, M0 and M1 stages of the pipeline to issue the instructions as appropriate.

The ISU 120 contains an instruction decode block isu_fd_dec 210; a CE logic block isu_cexe 220; a program counter (PC) controller isu_ctl 230; an instruction queue (containing an instruction queue control block isu_queue_ctl 240 and an instruction queue block isu_queue 250); an instruction grouping block isu_group 260; a secondary control logic block isu_2nd_dec 270; and a dispatch logic block isu_dispatch 280.

The PFU 110 sends up to six partially-decoded and aligned instructions to isu_fd_dec 210. These instructions are stored in a six slot queue 211. Each slot in the queue 211 consists of major and minor opcode decoders and additional decode logic 212. The instructions are fully decoded in the F/D stage of the pipeline. The instructions in the queue 211 are only replaced (retired) from the queue 211 after having been successfully grouped in the GR stage.

The contents of the queue 211 are sent to grouping logic in the GR stage of the pipeline for hazard detection. Instruction grouping logic 263 within isu_group 260 governs the GR stage. The instruction grouping logic 263 embodies a predefined set of rules, implemented in hardware (including logic 262 devoted to performing dependency checks, e.g., write-after-write, read-after-write and write-after-read), that determines which instructions can be grouped together for execution in the same clock cycle. The grouping process is important to the operation and overall performance of the DSP 100, because instruction opcodes, instruction valid signals, operand register reads and relevant signals are dispatched to appropriate functional units in subsequent pipeline stages based upon its outcome. Resource allocation logic 261 assists in the dispatch of this information.

The CE logic block isu_cexe 220 is responsible for identifying CE (cexe) instructions and tagging the beginning and ending instructions of the cexe blocks that they define in the queue 211. When instructions in a cexe block are provided to the GR stage, they are specially tagged to ensure that the instruction grouping logic 263 groups them for optimal execution. In the embodiment of the ISU 200 set forth in FIG. 2, the mechanism of the present invention is contained in part in isu_cexe 220.

The PC controller isu_ctl 230 includes a PC register, a trap PC (TPC) register, activated when an interrupt is asserted, and a return PC (RPC) register, activated when a call occurs. These registers have associated queues: a PC queue 231, a TPC last-in, first-out queue 232 and an RPC first-in, first-out queue 233. isu_ctl 230 also contains logic to update these registers and queues 231, 232, 233. A mispredict PC register, a mispredict first-in, first-out queue 234 and associated logic keep track of mispredictions. Fetch PC logic 235 controls the prefetching of instructions and, accordingly, the PFU 110 of FIG. 1. Subsequent PCS are calculated based on the number of the instructions grouped in the GR stage and the current state of the DSP 100. The state of the DSP 100 is affected by interrupts, branch mispredictions and return instructions.

The instruction queue (containing isu_queue_ctl 240 and isu_queue 250) actually contains the instructions which are queued for dispatch to the pipeline. The queue itself, isu_queue 250, has six 91-bit entries and input and output multiplexers (not shown). isu_queue 250 has a variable depth that depends upon the number of instructions grouped therein. isu_queue_ctl 240 contains all isu_queue 250 control logic 241 and instruction retire logic 242. For the purpose of saving power, this instruction retire logic 242 checks for "tight loops." A "tight loop" is defined as a loop that has a maximum of six instructions. A tight loop can and should continue to reside within isu_queue 250 until it has been executed for the last time. This saves power and time by foregoing repeated reloading of the tight loop. As instructions are retired from isu_queue 250, newly decoded instructions in the queue 211 can be written to its empty slots.

The secondary control logic block isu_2nd_dec 270 provides additional instruction decode logic 271 for the GR, RD, M0 and M1 stages of the pipeline. The main function of the additional instruction decode logic 271 is to provide additional information from each instruction's opcode to isu_group 260. The instruction decoders in isu_2nd_dec 270 are the same as those employed in the additional decode logic 212 of isu_fd_dec 210.

Finally, the dispatch logic block isu_dispatch 280 includes control logic 281, five native opcode staging registers 282, 283, 284, 285, 286 (corresponding to the RD, AG, M0, M1 and EX stages of the pipeline) and logic (not shown) to generate instruction valid signals. isu_dispatch 280 also transmits register addresses for source and destination registers and read enable signals to the BYP 190, the ORF 180, and the ARF 170. Among other things, the control logic 281 uses grouping information and a branch mispredict signal to determine when the staging registers 282, 283, 284, 285, 286 require updating.

Figure 3:
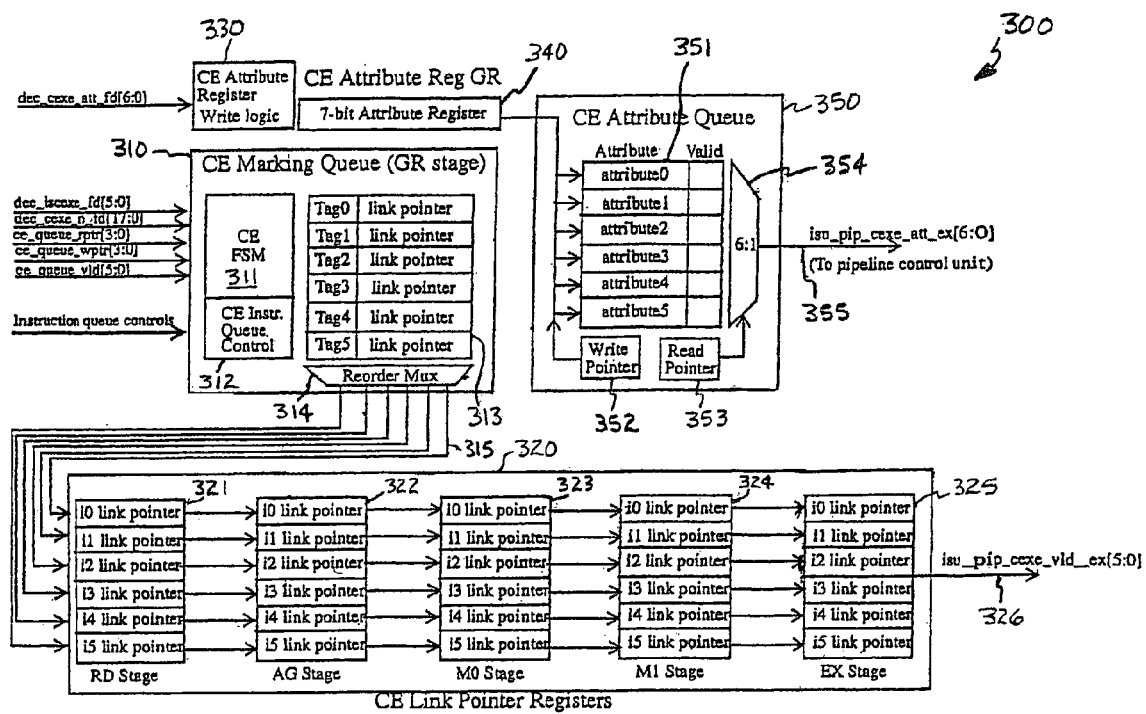
FIG. 3 illustrates a block diagram of a mechanism for conditionally executing instructions constructed according to the principles of the present invention.

Turning now to FIG. 3, illustrated is a block diagram of a mechanism, generally designated 300, for conditionally executing instructions constructed according to the principles of the present invention. FIG. 3 brings together portions of the mechanism that, in the illustrated embodiment, are distributed around the DSP 100 of FIG. 1. For example, while most of the mechanism 300 is associated with isu_cexe 220, some is associated with the GR stage of the pipeline. Those skilled in the pertinent art should understand that the principles of the present invention do not depend upon how the physical circuitry is centralized or distributed throughout the processor or DSP.

The mechanism 300 is illustrated as including a CE marking queue 310. The CE marking queue 310 is associated with the GR stage of the pipeline and includes a cexe finite state machine (FSM) 311, a CE instruction queue control 312, a five-bit, six-entry marking queue 313, a reordering multiplexer 314 and an output bus 315. The CE marking queue 310 is responsible for determining if a cexe instruction is being written into the instruction queue and marking all instructions in a cexe block as they enter the GR stage.

The mechanism 300 is further illustrated as including CE link pointer registers 320. The CE link pointer registers 320 are divided into five sets of six registers each, the five sets corresponding to five stages of the pipeline. A first set 321 corresponds to the RD stage. A second set 322 corresponds to the AG stage. A third set 323 corresponds to the M0 stage. A fourth set 324 corresponds to the M1 stage. Finally, a fifth set 325 corresponds to the EX stage. An output bus 326 extends from the CE link pointer registers 320 to the PIP 130 of FIG. 1.

The mechanism 300 also includes CE attribute register write logic 330, a seven-but attribute register 340 (associated with the GR stage of the pipeline) and a CE attribute queue 350. The CE attribute queue 350 includes an eight-bit, six-entry queue 351, a queue write pointer (WPT) 352, a queue read pointer (RPT) 353 a 6:1 selecting multiplexer 354 and an output bus 355 that extends from the selecting multiplexer 354 to the PIP 130 of FIG. 1.

As a cexe instruction enters the GR stage of the pipeline, it is implicitly assigned a unique tag and is marked as the first instruction in a new cexe block. The FSM 311 (which will be detailed in FIG. 3 and Table 3, below) keeps track of all instructions inside the cexe block and marks the beginning and the end of the cexe block. This information is encoded in the 2-bit link pointer registers of the marking queue 313.

The 6-bit queue 351 in the GR stage of the pipeline contains all the information in the cexe instruction, as shown in Table 2, below.

TABLE 2

The CE Attribute in the GR Stage of the Pipeline

| Bit Position | Description |
| --- | --- |
| Bit [6] - R bit | 0 - Select flag |
| | 1 - Select GPR register |
| Bit [5] - T bit | 0 - Check for false condition |
| | 1 - Check for true condition |
| Bit [4] - U bit | 0 - Do not update load/store pointers |
| | 1 - Update load/store pointers |

TABLE 2-continued

The CE Attribute in the GR Stage of the Pipeline

| Bit Position | Description |
|---|---|
| Bit [3] - S bit | 0 - Choose dynamic version of %hwflag |
|  | 1 - Choose sticky version of %hwflag |
| Bits [2:0] - F bits | 000 - <v> flag |
|  | 001 - <gv> flag |
|  | 010 - <sv> flag |
|  | 011 - <gsv> flag |
|  | 100 - <c> flag |
|  | 101 - <ge> flag |
|  | 110 - <gt> flag |
|  | 111 - <z> flag |

When the corresponding cexe instruction is grouped in the GR stage of the pipeline, the contents of the CE attribute register 340 are written into an available entry in the queue 351.

The queue 351 is a circular queue and is designed to handle up to six independent cexe blocks in the pipeline (from GR to EX stage). The attribute field of an entry is identical to the bits in the attribute register in GR. There is a valid bit associated with each entry. This bit is set when a cexe instruction that was grouped in GR has come to the RD stage of the pipeline. It is cleared when an end of a block or a branch mispredict is detected in EX. The attribute entries have a format given by Table 2, below.

Since only one cexe instruction is allowed in a particular pipeline stage at any time, the queue 351 is incapable of overflowing. The WPT 352 and RPT 353 are used to indicate the bottom and top of the queue 351, respectively. The WPT 352 is updated when a cexe instruction is grouped in the GR stage of the pipeline, whereas the RPT 353 is updated when an end of a block is detected in the EX stage of the pipeline and there is at least another valid entry in the queue 351.

In the illustrated embodiment, the attributes in the queue 351 are tagless, i.e., no tag is explicitly assigned to a cexe block. The RPT 353 is used to keep track of the order of the CE instructions, and always points to the oldest cexe instruction in the pipeline. The zero reset values of the WPT 352 and the RPT 353 imply that the first cexe instruction always starts with the RPT 353 equal to zero.

As previously described, each set of CE link pointer registers corresponds to a pipeline stage. Each entry in a set corresponds to an instruction in a stage. The link pointers in the CE link pointer registers 320 are used to detect the end of a cexe block and update the read pointer in the EX stage of the pipeline.

The cexe block is not interruptible. Therefore, the link pointers in the GR stage of the pipeline are needed correctly to terminate the instruction grouping at the end of the cexe block.

After reset, all link pointers are cleared. A mispredict condition in EX stage also causes all of the link pointers corresponding to the RD, AG, M0 and M1 stages of the pipeline to be cleared.

Figure 4:
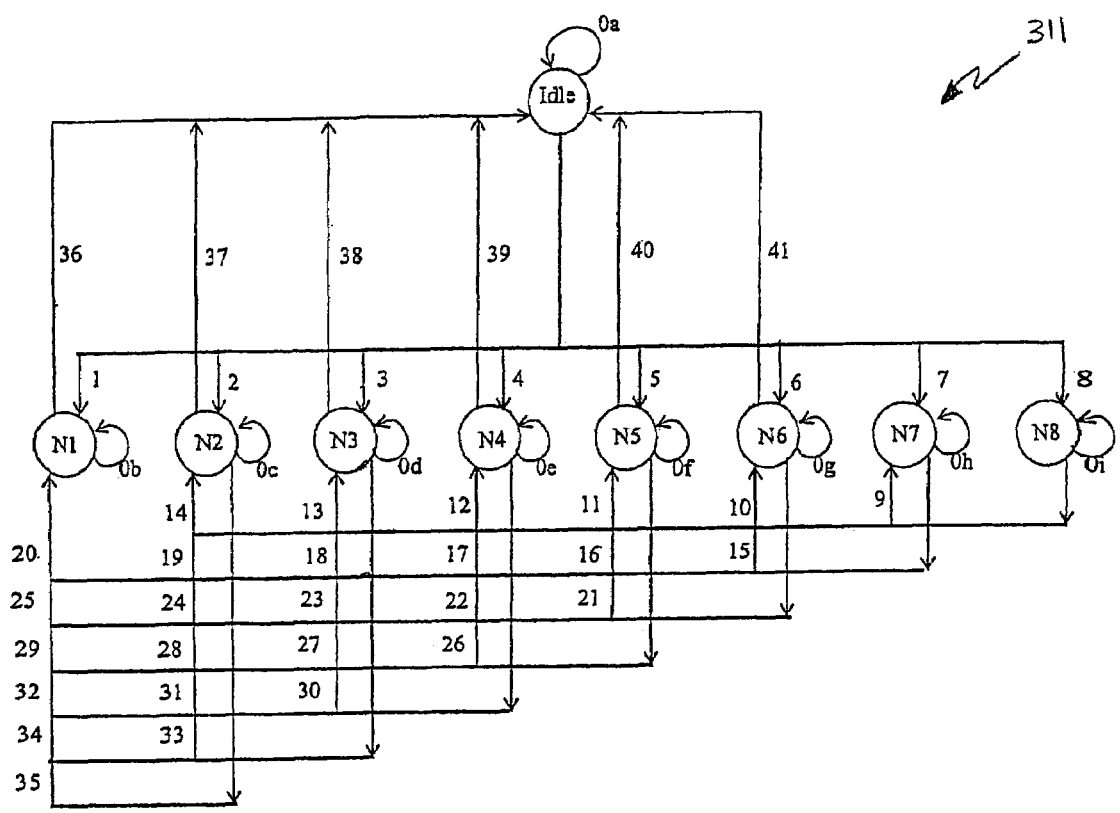
FIG. 4 illustrates a state diagram of a cexe finite state machine that forms a part of the exemplary mechanism of FIG. 3.

Turning now to FIG. 4, illustrated is a state diagram of the cexe FSM 311 of FIG. 3. As is apparent, the cexe FSM 311 has nine valid states: Idle, N1, N2, N3, N4, n5, n6, N7 and N8. The states and transitions of the cexe FSM 311 are best understood by examining Table 3, below, with reference to FIG. 4.

TABLE 3 cexe FSM State Table (NStates -> Others)

| Current State | | 0 (cexe) | Valid Instructions in the F/D Stage of the Pipeline (Entering the GR Stage in the Next Cycle) | | | | | Next State | |
|---|---|---|---|---|---|---|---|---|---|
| | | | 1 | 2 | 3 | 4 | 5 | | |
| 0000 | Idle | 0 | x | x | x | x | x | 0000 | Idle |
| | | n = 000 | | | | | | 1000 | N1 (1) |
| | | n = 001 | | | | | | 1001 | N2 (2) |
| | | n = 010 | | | | | | 1010 | N3 (3) |
| | | n = 011 | | | | | | 1011 | N4 (4) |
| | | n = 100 | | | | | | 1100 | N5 (5) |
| | | n = 101 | | | | | | 1101 | N6 (6) |
| | | n = 110 | | | | | | 1110 | N7 (7) |
| | | n = 111 | | | | | | 1111 | N8 (8) |
| | | 1 | 1 | 0 | 0 | 0 | 0 | | |
| | | n = 000 | | | | | | 0000 | Idle (0a) |
| | | n = 001 | | | | | | 1000 | N1 (1) |
| | | n = 010 | | | | | | 1001 | N2 (2) |
| | | n = 011 | | | | | | 1010 | N3 (3) |
| | | n = 100 | | | | | | 1011 | N4 (4) |
| | | n = 101 | | | | | | 1100 | N5 (5) |
| | | n = 110 | | | | | | 1101 | N6 (6) |
| | | n = 111 | | | | | | 1110 | N7 (7) |
| | | 1 | 1 | 1 | 0 | 0 | 0 | | |
| | | n = 000 | | | | | | 0000 | Idle (0a) |
| | | n = 001 | | | | | | 0000 | Idle (0a) |
| | | n = 010 | | | | | | 1000 | N1 (1) |
| | | n = 011 | | | | | | 1001 | N2 (2) |
| | | n = 100 | | | | | | 1010 | N3 (3) |
| | | n = 101 | | | | | | 1011 | N4 (4) |
| | | n = 110 | | | | | | 1100 | N5 (5) |
| | | n = 111 | | | | | | 1101 | N6 (6) |
| | | 1 | 1 | 1 | 1 | 0 | 0 | | |
| | | n = 000 | | | | | | 0000 | Idle (0a) |
| | | n = 001 | | | | | | 0000 | Idle (0a) |
| | | n = 010 | | | | | | 0000 | Idle (0a) |
| | | n = 011 | | | | | | 1000 | N1 (1) |
| | | n = 100 | | | | | | 1001 | N2 (2) |
| | | n = 101 | | | | | | 1010 | N3 (3) |
| | | n = 110 | | | | | | 1011 | N4 (4) |
| | | n = 111 | | | | | | 1110 | N5 (5) |
| | | 1 | 1 | 1 | 1 | 1 | 0 | | |
| | | n = 000 | | | | | | 0000 | Idle (0a) |
| | | n = 001 | | | | | | 0000 | Idle (0a) |
| | | n = 010 | | | | | | 0000 | Idle (0a) |
| | | n = 011 | | | | | | 0000 | Idle (0a) |
| | | n = 100 | | | | | | 1000 | N1 (1) |
| | | n = 101 | | | | | | 1001 | N2 (2) |
| | | n = 110 | | | | | | 1010 | N3 (3) |
| | | n = 111 | | | | | | 1011 | N4 (4) |
| | | 1 | 1 | 1 | 1 | 1 | 1 | | |
| | | n = 000 | | | | | | 0000 | Idle (0a) |
| | | n = 001 | | | | | | 0000 | Idle (0a) |
| | | n = 010 | | | | | | 0000 | Idle (0a) |
| | | n = 011 | | | | | | 0000 | Idle (0a) |
| | | n = 100 | | | | | | 0000 | Idle (0a) |
| | | n = 101 | | | | | | 1000 | N1 (1) |
| | | n = 110 | | | | | | 1001 | N2 (2) |
| | | n = 111 | | | | | | 1010 | N3 (3) |
| 1000 | N1 | 0 | 0 | 0 | 0 | 0 | 0 | 1000 | N1 (0b) |
| | | 1 | x | x | x | x | x | 0000 | Idle (36) |
| 1001 | N2 | 0 | 0 | 0 | 0 | 0 | 0 | 1001 | N2 (0c) |
| | | 1 | 0 | 0 | 0 | 0 | 0 | 1000 | N1 (35) |
| | | 1 | 1 | x | x | x | x | 0000 | Idle (37) |
| 1010 | N3 | 0 | 0 | 0 | 0 | 0 | 0 | 1010 | N3 (0d) |
| | | 1 | 0 | 0 | 0 | 0 | 0 | 1001 | N2 (33) |
| | | 1 | 1 | 0 | 0 | 0 | 0 | 1000 | N1 (34) |
| | | 1 | 1 | 1 | x | x | x | 0000 | Idle (38) |
| 1011 | N4 | 0 | 0 | 0 | 0 | 0 | 0 | 1011 | N4 (0e) |
| | | 1 | 0 | 0 | 0 | 0 | 0 | 1010 | N3 (30) |
| | | 1 | 1 | 0 | 0 | 0 | 0 | 1001 | N2 (31) |
| | | 1 | 1 | 1 | 0 | 0 | 0 | 1000 | N1 (32) |
| | | 1 | 1 | 1 | 1 | x | x | 0000 | Idle (39) |

TABLE 3-continued cexe FSM State Table (NStates -> Others)

| Current State | | 0 (cexe) | Valid Instructions in the F/D Stage of the Pipeline (Entering the GR Stage in the Next Cycle) | | | | | Next State | |
|---|---|---|---|---|---|---|---|---|---|
| | | | 1 | 2 | 3 | 4 | 5 | | |
| 1100 | N5 | 0 | 0 | 0 | 0 | 0 | 0 | 1100 | N5 (0f) |
| | | 1 | 0 | 0 | 0 | 0 | 0 | 1011 | N4 (26) |
| | | 1 | 1 | 0 | 0 | 0 | 0 | 1010 | N3 (27) |
| | | 1 | 1 | 1 | 0 | 0 | 0 | 1001 | N2 (28) |
| | | 1 | 1 | 1 | 1 | 0 | 0 | 1000 | N1 (29) |
| | | 1 | 1 | 1 | 1 | 1 | x | 0000 | Idle (40) |
| 1101 | N6 | 0 | 0 | 0 | 0 | 0 | 0 | 1101 | N6 (0g) |
| | | 1 | 0 | 0 | 0 | 0 | 0 | 1100 | N5 (21) |
| | | 1 | 1 | 0 | 0 | 0 | 0 | 1011 | N4 (22) |
| | | 1 | 1 | 1 | 0 | 0 | 0 | 1010 | N3 (23) |
| | | 1 | 1 | 1 | 1 | 0 | 0 | 1001 | N2 (24) |
| | | 1 | 1 | 1 | 1 | 1 | 0 | 1000 | N1 (25) |
| | | 1 | 1 | 1 | 1 | 1 | 1 | 0000 | Idle (41) |
| 1110 | N7 | 0 | 0 | 0 | 0 | 0 | 0 | 1110 | N7 (0h) |
| | | 1 | 0 | 0 | 0 | 0 | 0 | 1101 | N6 (15) |
| | | 1 | 1 | 0 | 0 | 0 | 0 | 1100 | N5 (16) |
| | | 1 | 1 | 1 | 0 | 0 | 0 | 1011 | N4 (17) |
| | | 1 | 1 | 1 | 1 | 0 | 0 | 1010 | N3 (18) |
| | | 1 | 1 | 1 | 1 | 1 | 0 | 1001 | N2 (19) |
| | | 1 | 1 | 1 | 1 | 1 | 1 | 0000 | N1 (20) |
| 1111 | N8 | 0 | 0 | 0 | 0 | 0 | 0 | 1111 | N8 (0i) |
| | | 1 | 0 | 0 | 0 | 0 | 0 | 1110 | N7 (9) |
| | | 1 | 1 | 0 | 0 | 0 | 0 | 1101 | N6 (10) |
| | | 1 | 1 | 1 | 0 | 0 | 0 | 1100 | N5 (11) |
| | | 1 | 1 | 1 | 1 | 0 | 0 | 1011 | N4 (12) |
| | | 1 | 1 | 1 | 1 | 1 | 0 | 1010 | N3 (13) |
| | | 1 | 1 | 1 | 1 | 1 | 1 | 1001 | N2 (14) |

Notes:
tag 0 denotes a cexe instruction
x - Don't care
n - the number of instructions in the cexe block
*idle -> other state requires that any cexe insutrctions in the GR state must be grouped
(#)s correspond to the paths in the state diagram of FIG. 4

Note that, in the particular instruction set that is employed in the illustrated embodiment of the present invention, the cexe instruction is a unique instruction. If the S bit (sticky bit) is cleared, the shadow register of the hardware flags, %shwflag, is updated with the contents of the %hwflag when this instruction reaches the EX stage of the pipeline. Otherwise, the cexe instruction is treated as a no-op (NOP).

Figure 5:
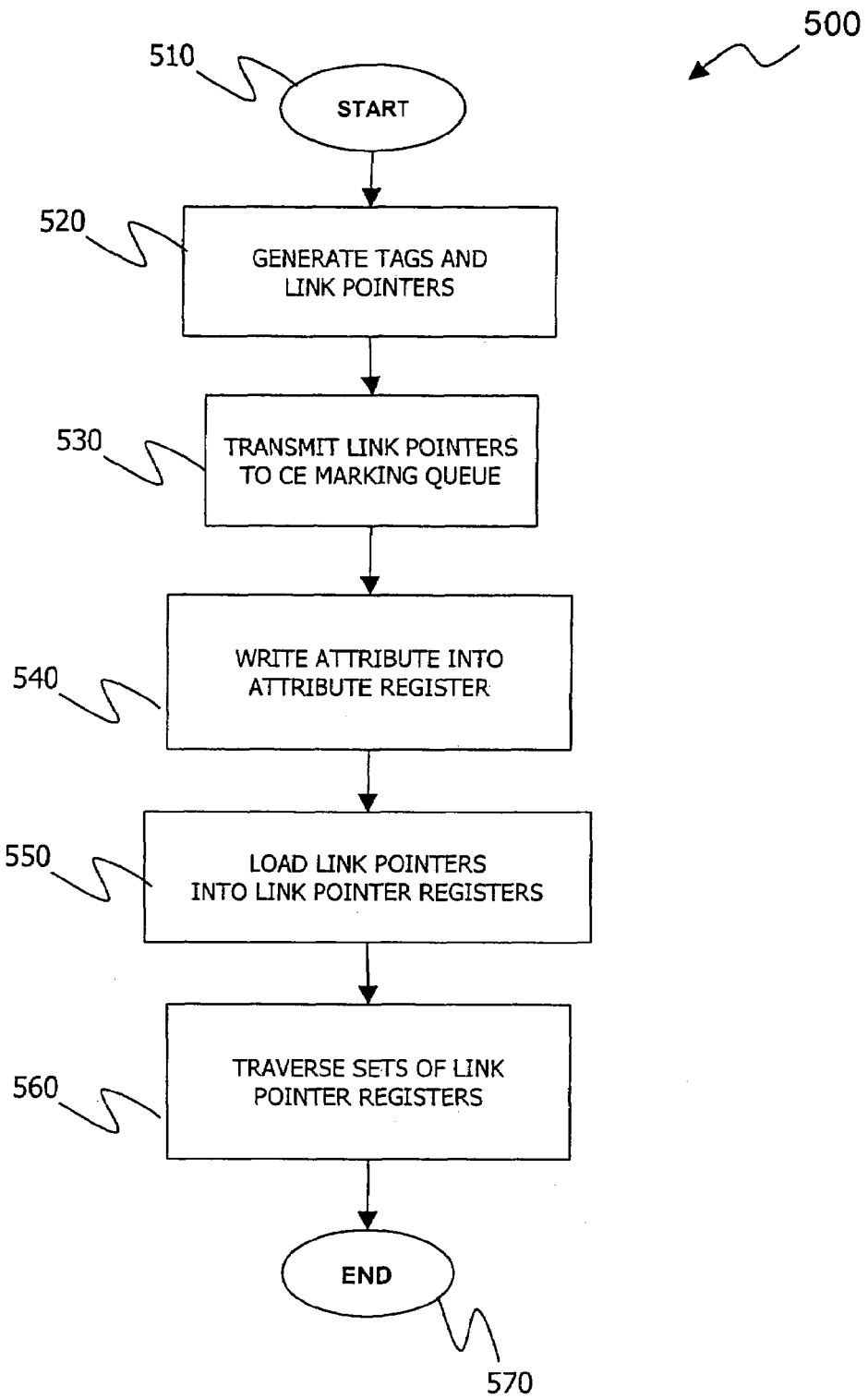
FIG. 5 illustrates a method of conditionally executing instructions carried out according to the principles of the present invention.

FIG. 5 illustrates a method, generally designated 500, of conditionally executing instructions carried out according to the principles of the present invention. The method 500 begins in a start step 510, wherein a cexe instruction enters isu_cexe 220. In a step 520, the cexe FSM (311 of FIG. 3) generates tags and link pointers for all instructions located in a CE block that is associated with the cexe instruction.

Next, in a step 530, the link pointers are transmitted to the queue (313 of FIG. 3), where they are stored until needed in the CE link pointer registers (320 of FIG. 3).

In a step 540, CE attribute register write logic (330 of FIG. 3) causes a seven-bit attribute to be written into the CE attribute register (340 of FIG. 3) associated with the GR stage of the pipeline. When the cexe instruction is grouped in the GR stage of the pipeline, the contents of the CE attribute register are written into an available entry in the queue (351 of FIG. 3).

In a step 550, link pointers are chosen via the reordering multiplexer (314 of FIG. 3) and transmitted to the first set (321 of FIG. 3) of the CE link pointer registers. Thereafter, in a step 560, the link pointers are caused to traverse the various sets (322, 323, 324, 325 of FIG. 3) of the CE link pointer registers as their associated instructions located in the CE block move through the corresponding stages of the pipeline. The method 500 ends in an end step 570.

Although the present invention has been described in detail, those skilled in the art should understand that they can make various changes, substitutions and alterations herein without departing from the spirit and scope of the invention in its broadest form.

What is claimed is:

1. For use in a wide-issue processor, a mechanism for identifying and tracking conditional instructions, comprising:
    a conditional execution block state machine that tags and generates contemporaneous link pointers for instructions located in a conditional execution block, wherein said link pointers mark at least the beginning and end of a conditional execution block of instructions; and
    conditional link pointer register sets, wherein each of said register sets corresponds to a single stage of a pipeline of said processor, that contain and cause said link pointers to move through each corresponding register of said register sets as said instructions associated with said link pointers and located in said conditional execution block move through each of said corresponding stages, said corresponding stages including a fetch/decode stage and a group stage.

2. The mechanism as recited in claim 1 further comprising a conditional execution marking queue, associated with said conditional execution block state machine, that contains ones of said link pointers prior to storage in said sets.

3. The mechanism as recited in claim 2 wherein said conditional execution marking queue is a five-bit, six-entry queue and comprises a reordering multiplexer.

4. The mechanism as recited in claim 1 further comprising a conditional execution attribute register, associated with a group stage of said pipeline, that contains an attribute associated with one of said conditional instructions.

5. The mechanism as recited in claim 4 further comprising a conditional execution attribute queue that contains attributes read from said conditional execution attribute register.

6. The mechanism as recited in claim 5 wherein said conditional execution attribute queue is of variable depth and comprises a selecting multiplexer.

7. The mechanism as recited in claim 1, wherein:
    said fetch/decode stage is configured to:
        fetch and decode instructions;
        identify conditional execution instructions; and
        generate said link pointers; and
    said group stage is configured to:
        check grouping and dependency rules;
        group valid instructions;
        execute return instructions; and
        group conditional execution instructions and blocks.

8. A wide-issue digital signal processor (DSP), comprising:
    a pipeline having stages capable of executing instructions conditionally;
    a wide-issue instruction issue unit;
    a conditional execution block state machine, associated with said instruction issue unit, that tags and generates contemporaneous link pointers for instructions located in a conditional execution block, wherein said link pointers mark at least the beginning and end of a conditional execution block of instructions; and conditional link pointer register sets, wherein each of said register sets corresponds to a single stage of a pipeline of said processor, that contain and cause said link pointers to move through each corresponding register of said register sets as said instructions associated with said link pointers and located in said conditional execution block move through each of said corresponding stages, said corresponding stages including a fetch/decode stage and a group stage.

9. The DSP as recited in claim 8 further comprising a conditional execution marking queue, associated with said conditional execution block state machine, that contains ones of said link pointers prior to storage in said sets.

10. The DSP as recited in claim 9 wherein said conditional execution marking queue is a five-bit, six-entry queue and comprises a reordering multiplexer.

11. The DSP as recited in claim 8 further comprising a conditional execution attribute register, associated with a group stage of said pipeline, that contains an attribute associated with one of said conditional instructions.

12. The DSP as recited in claim 11 further comprising a conditional execution attribute queue that contains attributes read from said conditional execution attribute register.

13. The DSP as recited in claim 12 wherein said conditional execution attribute queue is of variable depth and comprises a selecting multiplexer.

14. The DSP as recited in claim 8, wherein:
said fetch/decode stage is configured to:
 fetch and decode instructions;
 identify conditional execution instructions; and
 generate said link pointers; and
said group stage is configured to:
 check grouping and dependency rules;
 group valid instructions;
 execute return instructions; and
 group conditional execution instructions and blocks.

* * * * *